United States Patent [19]
Marcuse et al.

[11] Patent Number: 5,966,478
[45] Date of Patent: Oct. 12, 1999

[54] INTEGRATED OPTICAL CIRCUIT HAVING PLANAR WAVEGUIDE TURNING MIRRORS

[75] Inventors: Dietrich Marcuse, Lincroft; Herman Melvin Presby, Highland Park, both of N.J.

[73] Assignee: Lucent Technologies Inc., Murray Hill, N.J.

[21] Appl. No.: 08/932,936

[22] Filed: Sep. 17, 1997

[51] Int. Cl.[6] ........................................... G02B 6/12
[52] U.S. Cl. ............................................. 385/14; 385/131
[58] Field of Search ..................... 385/14, 49, 129–132

[56] References Cited

U.S. PATENT DOCUMENTS

| | | | |
|---|---|---|---|
| 4,750,799 | 6/1988 | Kawachi et al. | 350/96.11 |
| 5,135,605 | 8/1992 | Blonder et al. | 156/628 |
| 5,480,764 | 1/1996 | Gal et al. | 430/321 |
| 5,650,123 | 7/1997 | Saini et al. | 422/82.11 |

OTHER PUBLICATIONS

C.H. Henry et al., "Glass Waveguides on Silicon for Hybrid Optical Packaging", 7 *J. Lightwave Technol.*, pp. 1530–1539 (1989).

H.M. Presby, "Silica Integrated Optical Circuits", (SPIE Optical Engineering Press, Bellingham, WA 1996).

*Primary Examiner*—Hung N. Ngo
*Attorney, Agent, or Firm*—Robert Rudnick

[57] ABSTRACT

An integrated optical circuit having a turning mirror formed by an end surface of a planar waveguide forms a turning mirror deflector surface. More specifically, the integrated optical circuit includes a planar optical waveguide formed within a cladding layer wherein the planar waveguide has a deflector end surface positioned adjacent to a region, such as a gap. The refractive indices of the planar waveguide and region are in a ratio of no less than approximately 1.3 to provide a desired refractive index discontinuity. This refractive index discontinuity in combination with the positioning of the deflector end surface at an angle relative to an axis extending perpendicular to the direction of the waveguide in the range of 24° and 67° enables an advantageous deflection of an optical signal.

13 Claims, 2 Drawing Sheets

INTEGRATED OPTICAL CIRCUIT HAVING PLANAR WAVEGUIDE TURNING MIRRORS

FIELD OF THE INVENTION

The invention is directed to integrated optical circuits, such as silica optical circuits, employing turning mirrors for directing optical signals into and/or out of planar waveguides.

BACKGROUND OF THE INVENTION

Integrated optical devices for directly processing optical signals have become of greater importance as optical fiber communications increasingly replace metal cable and microwave transmission links. Integrated optical devices can advantageously be implemented as silica optical circuits having compact dimensions at relatively low cost. Silica optical circuits employ integrated glass waveguide structures formed on silicon substrates. The basic structure of such devices is described in C. H. Henry et al., "Glass Waveguides on Silicon for Hybrid Optical Packaging", 7 *J. Lightwave Technol.*, pp. 1530–1539 (1989) (Henry et al. reference), which is herein incorporated by reference.

Typically, in silica optical circuits, a silicon substrate is provided with a base layer of $SiO_2$, and a thin core layer of doped silica glass is deposited on the $SiO_2$ layer. The core layer can be configured to a desired waveguide structure using standard photolithographic techniques. Then, a layer of doped silica glass is deposited over the core layer to act as an upper cladding. Further, numerous passive optical circuit components have been formed within conventional silica optical circuits to desirably provide signal processing in addition to optical signal routing within the silica optical circuit structure. Examples including, for example, low-pass, high-pass, band-pass and notch filters, couplers, multiplexers and demultiplexers. Configurations of typical passive optical components formed within silica optical circuits are described in, for example, H. M. Presby, "Silica Integrated Optical Circuits" (SPIE Optical Engineering Press, Bellingham, Wash. 1996).

However, typical optical circuit applications require passive as well as active devices, such as optical signal detectors and transmitters as well as modulators. In order to provide such applications, conventional optical circuits often interconnect active devices with passive optical devices formed within silica optical circuits using optical fibers. In such configurations, waveguides extend to edge surfaces of the silica optical circuits where edge connectors attach the optical fibers. However, the attachment of the edge connectors undesirably increases circuit fabrication costs and the resulting configuration is typically undesirably larger than the silica optical circuit requiring greater space in an associated optical system.

U.S. Pat. Nos. 5,135,605 and 4,750,799 describe fabrication techniques for producing hybrid integrated optical circuits in which active optical components are mounted on a top surface of a silica optical circuit. These hybrid integrated optical circuits have relatively compact dimensions compared to the previously silica optical circuits interconnected with active devices by optical fibers. In the hybrid integrated optical circuits, turning mirrors are positioned under a mounted active device and proximate an end of a planar waveguide to enable an exchange of optical signals between the active device and the planar waveguide. Conventional turning mirrors have reflective surfaces positioned opposite an end surface of the planar waveguide and at a 45° angle relative to the direction of the waveguide as well as a top surface of the circuit.

A cross-sectional side view of a exemplary optical circuit 1 having a conventional turning mirror configuration 5 is illustrated in FIG. 1. In FIG. 1, a planar waveguide 10 is formed between respective cladding layers 15 and 20. The cladding layer 20 is disposed on a substrate 25, such as a silicon substrate. The turning mirror 5 is also positioned on the substrate 25 and has a reflective surface 7 at a 45° angle relative to the waveguide 10. A device 30, such as an optical signal detector and/or transmitter, is positioned on the mirror 5 and cladding layer 15. The device 30 is positioned to transmit an optical signal that deflects off the mirror surface 7 and into the waveguide 10 or receive an optical signal propagating through the waveguide 10 that is reflected by the mirror surface 7. An exemplary path for a light signal to travel between the device 30 and planar waveguide 10 is depicted by dashed line 35.

In accordance with the hybrid integrated optical device fabrication technique of U.S. Pat. No. 4,750,799, prefabricated mirror and waveguide components are secured to the substrate. However, such a fabrication technique is prohibitively expensive in a mass fabrication environment. In contrast, the fabrication technique of U.S. Pat. No. 5,135,605 more advantageously forms cladding and planar waveguide layers on a substrate. Then, a multi-step etching process is employed to create the profile of the turning mirror reflecting surface and waveguide end surface at the desired positions in the circuit. Such an etching technique reduces circuit fabrication costs as well as enables the formation of a greater number of turning mirrors in area of the integrated optical circuit.

Nevertheless, a need exists for a less complex turning mirror configuration that can be implemented at lower cost.

SUMMARY OF THE INVENTION

The invention is directed to an advantageous turning mirror configuration for integrated optical circuits. In an integrated optical circuit according to the invention, an end surface of a planar waveguide forms the turning mirror deflector surface instead of the conventional positioning of a turning mirror opposite an end surface of a planar waveguide. More specifically, a circuit according to the invention includes a planar optical waveguide formed within a cladding layer wherein the planar waveguide has a deflector end surface positioned adjacent to a region, such as a gap. The refractive indices of the planar waveguide and region are in a ratio of no less than approximately 1.3 to provide a desired refractive index discontinuity. This refractive index discontinuity in combination with the positioning of the deflector end surface at an angle relative to an axis extending perpendicular to the direction of the waveguide in the range of 24° and 67° enables an advantageous deflection of an optical signal.

Such an advantageous configuration enables an optical device, such as an optical signal detector and/or transmitter to be positioned over the waveguide turning mirror to enable optical signal communication between the device and the planar waveguide. In an exemplary embodiment, it is possible to exchange 95% of the energy of an optical signal between the waveguide and the active device employing an angle in the range of approximately 43.2° to 60°.

The turning mirror configuration of the invention facilitates manufacture of hybrid integrated optical circuits at relatively lower cost than conventional integrated optical circuits. It is possible to, for example, fabricate such turning mirrors at end surfaces of the optical circuit by forming an edge surface of the circuit at the desired angle. In the alternative, it is possible to fabricate such a turning mirror configuration by directing a light beam of sufficient power in a particular wavelength range incident on a particular area of a cladding layer containing a waveguide and at an appropriate angle to vaporize the cladding layer and waveguide to form the waveguide end deflector surface as described in the comonly-assigned patent application entitled, "METHOD FOR FORMING INTEGRATED OPTICAL CIRCUIT PLANAR WAVEGUIDE TURNING MIRRORS", co-filed herewith by H. M. Presby.

Additional features and advantages of the invention will become more readily apparent from the following detailed description and accompanying drawings.

DETAILED DESCRIPTION

Figure 1:
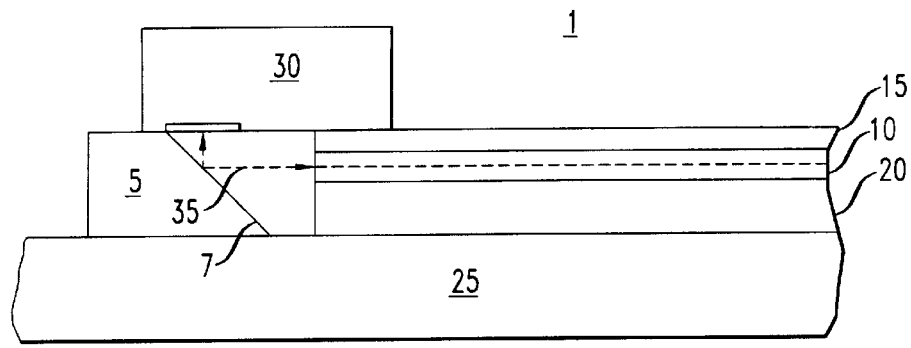
FIG. 1 illustrates a cross-sectional view of an exemplary turning mirror configuration in a conventional hybrid integrated optical circuit.
Figure 2:
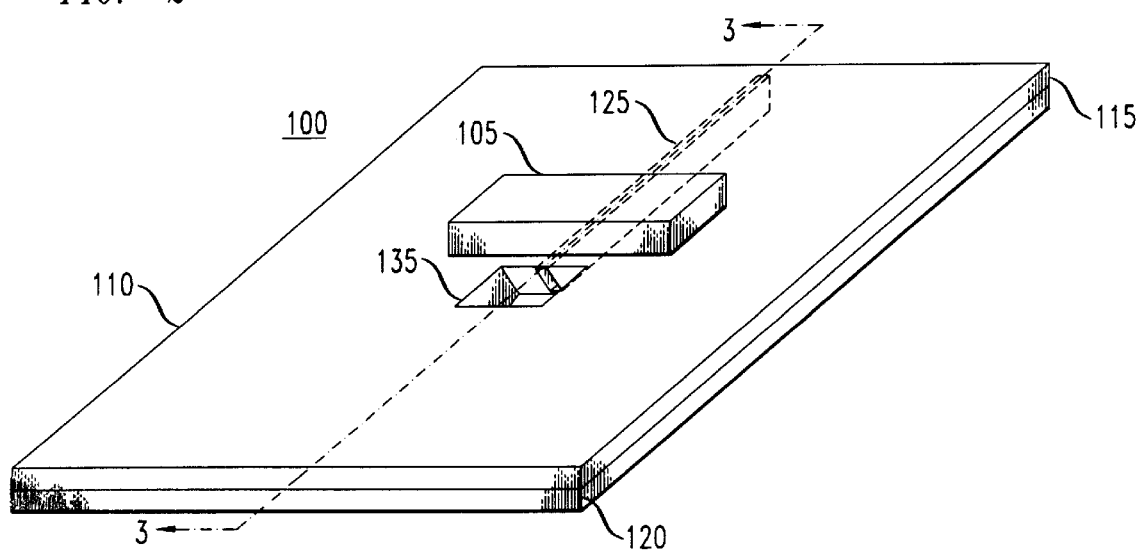
FIG. 2 illustrates a perspective view of an exemplary turning mirror configuration in a hybrid integrated optical circuit in accordance with the invention.
Figure 3:
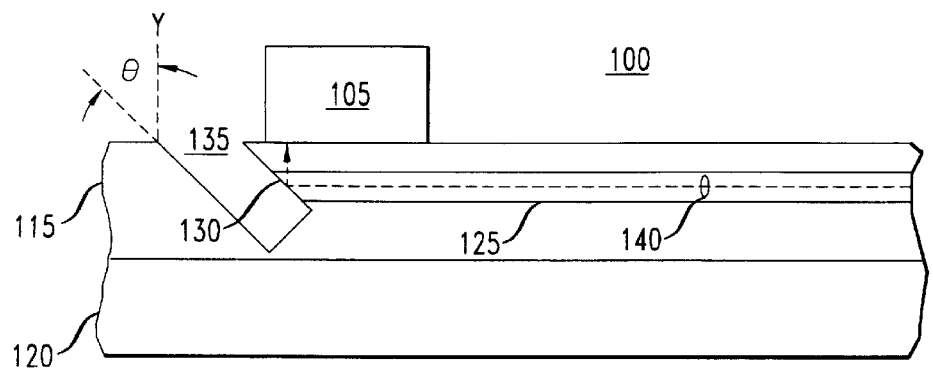
FIG. 3 illustrates a cross-sectional view of the hybrid integrated optical circuit of FIG. 2.

A hybrid optical circuit 100 having an exemplary turning mirror configuration in accordance with the invention is depicted in FIG. 2. A cross-sectional view of the hybrid optical circuit 100 of FIG. 2 taken along line 3–3' is shown in FIG. 3. Referring to FIGS. 2 and 3, the hybrid optical circuit 100 includes an active optical device 105, such as an optical signal transmitter or detector, positioned over an integrated optical circuit 110, such as a silica optical circuit. Modulators are exemplary other devices useable for the active device 105. The integrated optical circuit 110 includes a cladding layer 115, such as silica glass ($SiO_2$) formed on a substrate 120, such as a silicon substrate.

A planar optical waveguide 125 is formed within the cladding layer 115. The waveguide 125 has a deflector end surface 130 substantially extending at an angle θ relative to a Y-axis perpendicular to the direction of the waveguide 125. The active device 105 is positioned above the waveguide deflector end surface 130 to enable exchange of optical signals between the device 105 and the planar waveguide 125. An exemplary light path of an optical signal propagating in the planar waveguide 125 that is deflected by the deflector end surface 130 into the device 105 is illustrated as dashed line 140 in FIG. 3.

In order to provide optical signal deflection between the waveguide 125 and the device 105, a refractive index discontinuity is produced at the waveguide end by a region 135, such as a recess or notch, positioned adjacent to the waveguide end to produce the end surface 130 that deflects optical signals. The refractive index discontinuity is produced by the region 135 having a refractive index $n_0$ relative to the refractive index $n_{core}$ of the waveguide 120 wherein the refractive index ratio $n_{core}/n_0$ is at least approximately 1.3.

The particular method selected for fabricating the silica optical circuit 110 is not critical to practicing the invention. An exemplary fabrication process for the silica optical circuit 110 is as follows: a base layer of silica glass is deposited on the substrate 120, such as a silicon substrate using, for example, low pressure vapor chemical deposition or flame hydrolysis; and then a thin core layer of doped silica glass is deposited on this silica glass layer; the core layer is then configured to the desired structure of the waveguide 125 using standard photo-lithographic techniques, such as lithography, etching; and a layer of doped silica glass is then optionally deposited over the core layer to act as an upper cladding. A suitable doping profile for the doped silica glass is a uniform step-index distribution. While the proceeding description relates to silica on silicon waveguide devices, it should be understood that it is possible to fabricate the circuit on other substrate materials including, for example, fused quartz, ceramic or III–V materials, such as InP or GaAs.

The silica glass upper cladding and the base layer of silica glass form the silica glass 115. Suitable thicknesses for the base silica layer, core layer and upper cladding layer are 10 to 20 μm, 4 to 8 μm and 0 to 20 μm, respectively. Thicknesses less than 10 μm for the base silica layer are undesirable because of light loss to the substrate while thickness greater than 20 μm are generally disadvantageous because of long deposition times required to form such thicknesses. For a detailed discussion of glass waveguides on silicon and the fabrication thereof, see, for example, C. H. Henry et al., "Glass Waveguides on Silicon for Hybrid Optical Packaging", 7 *J Lightwave Technol.*, pp. 1530–1539 (1989), which is incorporated by reference herein. Although the above exemplary fabrication method produces a waveguide within the silica glass 115 that is completely buried, it is possible to fabricate such a waveguide within the silica glass 115 forming a portion of a silica glass top surface 150 or which are only partially buried.

The invention advantageously employs the refractive index discontinuity at the waveguide end surface 130 in combination with particular deflector angle θ settings to deflect optical signals. In the illustrated embodiment, a recess 135 is used to achieve the discontinuity. It is possible to produce the planar waveguide 125 having a refractive index $n_{core}$ on the order of 1.46 using the previously described fabrication method. Since air has a refractive index on the order of 1, the resulting refractive index ratio $n_{core}/n_0$ is a desirable 1.46.

The particular method employed to form the region or recess 135 is not critical to practicing the invention. An exemplary advantageous method for forming the recess is to vaporize the silica glass layer 115 in the recess shape using a light source, such as a laser, that produces a light beam having at least one wavelength in a particular wavelength range that is absorbed by silica glass. For example, approximately 100% of a light beam in the approximate wavelength range of 5 μm to 12 μm is absorbed by silica glass. In accordance with the advantageous method, such a light beam of sufficient power is directed incident on the region of the cladding layer at the desired deflector angle, wherein the corresponding absorption causes vaporization of the layer to produce the angled waveguide deflector end surface. Such a method is described in greater detail in the commonly-assigned patent application entitled "METHOD FOR FORMING INTEGRATED OPTICAL CIRCUIT PLANAR WAVEGUIDE TURNING MIRRORS", co-filed herewith by H. M. Presby and incorporated by reference herein. An alternative method of forming the refractive index discontinuity at the waveguide end 130 is to form the waveguide end surface 130 as an edge surface of the integrated optical structure as is described below with regard to FIG. 6.

It is possible for the formed recess region 135 to have edge surfaces including the waveguide deflector end surface 130 that is, for example, entirely or partially rectangular, cylindrical or variations thereof. Substantially rectangular shaped edge surfaces provide a substantially flat waveguide deflector end surface 130 that causes little or no additional dispersion or spreading of an optical signal at a surface of the circuit 110 that had propagated from the waveguide 125. As a consequence, the active device 105 requires only an optical signal detector area of at least the cross-sectional area of the planar waveguide 125 to substantially receive the extent of the optical signal power exiting the surface of the circuit 110.

In a similar manner, a substantially cylindrical waveguide deflector end surface 130 having an effective curvature diameter of at least four times greater than a corresponding cross-sectional dimension of the planar waveguide advantageously would also cause little or no additional dispersion or spreading of an optical signal transmitted between the device 105 and planar waveguide 125. An effective curvature diameter of a surface corresponds to an approximate shape of a particular dimension of that surface.

However, a substantially cylindrical waveguide deflector end surface 130 having an effective curvature diameter of less than four times the cross-sectional dimension of the planar waveguide causes a corresponding relative dispersion or defocusing or spreading of an optical signal at the surface of the circuit 110. As a consequence in such an arrangement, a detector optical device 105 should have a detector area that covers at least an adequate portion of the dispersed or spread area of a deflected optical signal to capture a desired portion of the energy of an optical signal.

Figure 4:
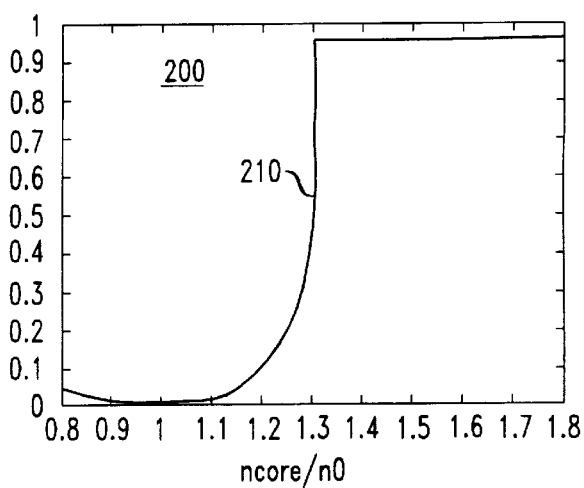
FIG. 4 illustrates a graph depicting an exemplary relationship between the portion of an optical signal propagating in a planar waveguide that is deflected to a surface of the circuit of FIGS. 2 and 3 based on different ratios of refractive indices of a planar waveguide and a region adjacent an end deflector surface of the waveguide.

FIG. 4 illustrates a graph 200 representing the deflection performance of exemplary turning mirrors in accordance with the invention for different refractive index discontinuity ratios $n_{core}/n_0$ between the respective refractive indices of the silica planar waveguide 125 and region 135 with a deflector angle θ of approximately 50°. The vertical axis of the graph 200 represents the portion of an optical signal propagating in the planar waveguide that reaches the active device 105 after being deflected by the deflector end surface 130 in FIGS. 2 and 3, and the horizontal graph axis represents refractive index ratios $n_{core}/n_0$ ranging from a ratio of 0.8 to 1.8.

The graph 200 clearly illustrates that a refractive index ratio $n_{core}/n_0$ of approximately 1.3 or greater produces a waveguide deflector end surface having advantageous deflection properties. In particular, the use of a refractive index ratio $n_{core}/n_0$ of approximately 1.3 or greater produces a waveguide deflector end surface that enables greater than 95% of the power of an optical signal propagating in the waveguide to be deflected out of the structure for detecting by the active device 105. Thus, it is possible to employ a conventional silica planar waveguide having a refractive index $n_{core}$ of approximately 1.46 with air in the adjacent recess or region having a refractive index $n_0$ of approximately 1 to produce an advantageous refractive index ratio $n_{core}/n_0$ of 1.46. Such a configuration is capable of deflecting greater than 95% optical signal power out of the waveguide for detection by an active device on a surface of the integrated optical circuit or to cause 95% of the power of a transmitted optical signal by a mode-matched active device 105 to enter the planar waveguide 125.

In contrast, a refractive index ratio $n_{core}/n_0$ of approximately 1.2 or less provides a relatively poor deflector surface with less 10% of the power of an optical signal propagating in the waveguide 125 being detectable by the active device 105. A refractive index ratio $n_{core}/n_0$ in the approximate range of 1.2 to 1.3 provides a deflector surface having a relatively widely varying deflector performance for exchanging 10% and 95% of the power of an optical signal between the device 105 and the waveguide 125. Thus, it is possible to provide a turning mirror in accordance with the invention with a refractive index ratio $n_{core}/n_0$ at a waveguide deflector end surface in the range of 1.2 to 1.3 if the corresponding deflection performance is adequate with regard to the intended application of the integrated optical circuit 100.

Figure 5:
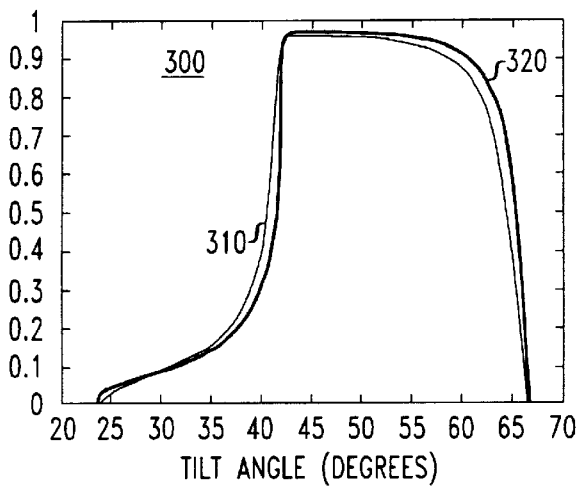
FIG. 5 illustrates a graph depicting an exemplary relationship between the portion of an optical signal propagating in a planar waveguide that is deflected to a surface of the circuit of FIGS. 2 and 3 based on different deflection angles selected for a deflection end surface of the waveguide.

FIG. 5 illustrates a graph 300 representing that the deflection performance of a turning mirror is also effected by the deflector angle θ of the waveguide deflector end surface 130 with respect to the Y-axis, shown in FIGS. 2 and 3. The graph 300 is based on a silica planar waveguide having approximately square cross-sectional dimension of height and width of 6 μm and a refractive index ratio $n_{core}/n_0$ at the waveguide deflector end surface of 1.305. Two curves 310 and 320 are illustrated in the graph 300 for different shapes of the waveguide deflector end surface. The curve 310 represents an optical signal deflection performance with a cylindrical waveguide deflector end surface having a diameter of approximately 20 μm.

In a similar manner, the curve 320 represents an optical signal deflection performance with a deflector end surface having an effective curvature diameter of approximately 50 μm or greater. Substantially the same deflection performance is achieved using a cylindrical waveguide deflector end surface having a diameter of 50 μm or a substantially flat waveguide deflector end surface having an effective curvature diameter of substantially infinity (∞), both of which are represented by the curve 320.

The curves 310 and 320 illustrate that employing a deflector angle θ in the relatively wide range of approximately 43° to 60° advantageously enables 90% or greater of the power of an optical signal propagating from the planar waveguide 125 to be deflected out of the circuit 110 for detection by the active device 105. However, a deflector angle θ between 24° and 43° as well as 60° and 67° is also useable in a circuit in accordance with the invention, albeit with a corresponding deflection performance of less than 90% of an optical signal detectable by the active device 105.

Figure 6:
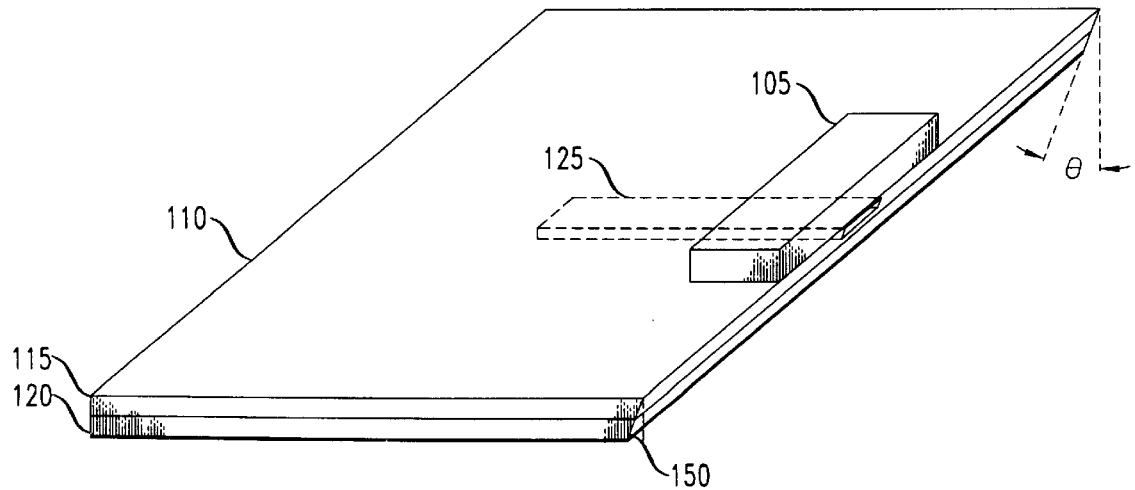
FIG. 6 illustrates a perspective view of an exemplary alternative integrated hybrid optical circuit configuration to that illustrated in FIGS. 2 and 3.

An alternative method of forming the refractive index discontinuity at the waveguide end 130 in FIGS. 2 and 3 is to form the waveguide end surface 130 as an edge surface of the integrated optical structure as is shown in FIG. 6. In FIGS. 2, 3 and 6, similar components are referenced by like numbers for clarity, for example, the waveguide 125 and the integrated optical structure 110. In FIG. 6, the deflector end surface 130 of the waveguide 125 is located at an edge surface 150 of the integrated optical structure 110. Further, the edge surface 150 is formed at the desired deflector angle θ to produce the desired turning mirror operation. It is possible to achieve the desired deflector angle θ on at least a portion of the edge surface 150 to produce the waveguide deflector end surface 130 by, for example, grinding and then polishing, or by cutting at the desired angle with a saw or laser beam. By using a portion of the integrated optical circuit edge surface 150 to provide the advantageous waveguide deflector end surface 130, the region or area adjacent that edge performs same function as the recess 135 in the circuit embodiment illustrated in FIGS. 2 and 3.

Although air is used to form the refractive index discontinuity in the illustrated embodiments, it is possible to use other materials in the region 135 of FIGS. 2 and 3 or a coating on the edge surface 130 for the embodiment of FIG. 4.

Although several embodiments of the invention have been described in detail above, many modifications can be made without departing from the teaching thereof. All of such modifications are intended to be encompassed within the following claims. For instance, although the invention has been described with respect to planar waveguides formed within silica optical circuits, it is possible for the invention to be implemented in integrated optical circuits formed of other materials including, for example, lithium niobate. Also, Although air is used to form the refractive index discontinuity in the illustrated embodiments, it is possible to use other materials in the region 135 of FIGS. 2 and 3 or a coating on the edge surface 130 for the embodiment of FIG. 4 having a relatively low refractive including, for example, low-index liquids or polymers.

The invention claimed is:

1. An optical circuit comprising:

a cladding layer; and a planar waveguide formed within the cladding layer, the planar waveguide having a deflector end surface positioned adjacent to a region, a ratio of refractive indices of the planar waveguide relative to the region being no less than approximately 1.3, and the waveguide deflector end surface positioned at angle relative to an axis extending perpendicular to the direction of the waveguide in the range of 24° and 67°.

2. The circuit of claim 1 further comprising an optical active device positioned on a major surface of the optical circuit proximate the waveguide deflector end surface for transmitting or receiving optical signals to or from the planar waveguide.

3. The circuit of claim 1 wherein the region is a recess formed in the cladding layer.

4. The circuit of claim 3 wherein the recess is a trench proximate the waveguide deflector end surface wherein said surface substantially extends in a plane.

5. The circuit of claim 3 wherein the recess and the waveguide deflector end surface is substantially curved.

6. The circuit of claim 5 wherein an effective curvature diameter of the recess and the waveguide deflector end surface is at least four times greater than a corresponding cross-sectional dimension of the planar waveguide.

7. The circuit of claim 3 wherein a material having a particular refractive index is disposed in the recess.

8. The circuit of claim 1 wherein the planar waveguide deflector end surface forms a portion of an edge surface of the optical circuit.

9. The circuit of claim 1 wherein the cladding layer comprises silica glass.

10. The circuit of claim 9 wherein the planar waveguide is a doped region of the silica glass cladding layer.

11. The circuit of claim 1 wherein the planar waveguide deflector end surface is positioned relative to the direction of the waveguide at an angle in the approximate range of 43° and 60°.

12. The circuit of claim 1 wherein the planar waveguide has a refractive index of no less than approximately 1.45.

13. The circuit of claim 1 wherein the region has a refractive index of approximately 1.

* * * * *